(12) United States Patent
Miyadera et al.

(10) Patent No.: US 9,036,198 B2
(45) Date of Patent: May 19, 2015

(54) OPTICAL-WRITING CONTROL DEVICE, IMAGE FORMING APPARATUS, AND METHOD OF CONTROLLING OPTICAL WRITING DEVICE

(71) Applicants: Tatsuya Miyadera, Kanagawa (JP); Masayuki Hayashi, Osaka (JP); Motohiro Kawanabe, Osaka (JP); Yoshinori Shirasaki, Osaka (JP); Masatoshi Murakami, Osaka (JP)

(72) Inventors: Tatsuya Miyadera, Kanagawa (JP); Masayuki Hayashi, Osaka (JP); Motohiro Kawanabe, Osaka (JP); Yoshinori Shirasaki, Osaka (JP); Masatoshi Murakami, Osaka (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/086,266

(22) Filed: Nov. 21, 2013

(65) Prior Publication Data
US 2014/0153010 A1 Jun. 5, 2014

(30) Foreign Application Priority Data

Nov. 30, 2012 (JP) ................................ 2012-262681

(51) Int. Cl.
*G06K 15/00* (2006.01)
*H04N 1/00* (2006.01)
*H04N 1/028* (2006.01)
*G03G 15/01* (2006.01)
*G03G 15/00* (2006.01)

(52) U.S. Cl.
CPC ....... *H04N 1/00246* (2013.01); *H04N 1/02815* (2013.01); *G03G 15/0189* (2013.01); *G03G 15/5058* (2013.01); *G03G 2215/0161* (2013.01)

(58) Field of Classification Search
CPC .............. H04N 1/053; G03G 15/5058; G03G 15/5054; G03G 2215/00569; G03G 2215/00599
USPC ............ 358/1.9, 1.18, 504, 518; 347/19, 116; 399/40, 49, 72
See application file for complete search history.

(56) References Cited

U.S. PATENT DOCUMENTS

| | | | |
|---|---|---|---|
| 2004/0070714 A1 | 4/2004 | Ishii et al. | |
| 2009/0074476 A1* | 3/2009 | Miyadera | 399/301 |
| 2010/0239331 A1* | 9/2010 | Miyadera et al. | 399/301 |
| 2011/0026082 A1 | 2/2011 | Miyadera et al. | |
| 2012/0288291 A1 | 11/2012 | Miyadera | |
| 2013/0070040 A1 | 3/2013 | Miyadera et al. | |

FOREIGN PATENT DOCUMENTS

| | | |
|---|---|---|
| JP | 2004-069767 | 3/2004 |
| JP | 2007-003986 | 1/2007 |

(Continued)

*Primary Examiner* — Jamares Q Washington
(74) *Attorney, Agent, or Firm* — Oblon, McClelland, Maier & Neustadt, L.L.P.

(57) ABSTRACT

An optical-writing control device calculates correction values for use in correcting a transfer position at which developing-agent images are to be transferred onto a sheet, and overlaying positions at which the developing-agent images are to be overlaid, based on a detection signal output from a sensor upon detection of a correction pattern for use in correcting the transfer position and a correction pattern for use in correcting the overlaying positions. A timing of detecting the pattern for use in correcting the overlaying positions is determined based on a correction value calculated based on the detection signal output upon detection of the pattern for use in correcting the transfer position. The pattern for use in correcting the transfer position is caused to have a width, in the main-scanning direction, that is wider than the width in the main-scanning direction of the pattern for use in correcting the overlaying positions.

7 Claims, 13 Drawing Sheets

(56) References Cited

FOREIGN PATENT DOCUMENTS

| JP | 2009-069767 | 4/2009 |
| JP | 2010-244029 | 10/2010 |
| JP | 2012-063499 | 3/2012 |
| JP | 2013-064811 | 4/2013 |
| JP | 2013-220576 | 10/2013 |
| JP | 2014-10402 | 1/2014 |
| JP | 2014-24276 | 2/2014 |

* cited by examiner

OPTICAL-WRITING CONTROL DEVICE, IMAGE FORMING APPARATUS, AND METHOD OF CONTROLLING OPTICAL WRITING DEVICE

CROSS-REFERENCE TO RELATED APPLICATIONS

The present application claims priority to and incorporates by reference the entire contents of Japanese Patent Application No. 2012-262681 filed in Japan on Nov. 30, 2012.

BACKGROUND OF THE INVENTION

1. Field of the Invention

The present invention relates to an optical-writing control device, an image forming apparatus, and a method of controlling an optical writing device and, more particularly, to a structure of a pattern to be drawn for correction of an image drawing position.

2. Description of the Related Art

In recent years, there are increasing tendencies to further digitization of information. Thus, image processing apparatuses such as printers and facsimiles for use in outputting digitized information and scanners for use in digitizing documents have become indispensable equipment. Such an image processing apparatus is typically configured as a multifunction peripheral (MFP) having an image capturing function, an image forming function, a communication function, and/or the like and is usable as a printer, a facsimile, a scanner, and/or a copier.

Among such image processing apparatuses, electrophotographic image forming apparatuses are widely used in outputting digitized documents. An electrophotographic image forming apparatus forms an electrostatic latent image by exposing a photosensitive element to light, develops the electrostatic latent image using a developing agent such as toner to form a toner image, and transfers the toner image onto a sheet to thereby produce a printout.

Such an electrophotographic image forming apparatus performs adjustment so that an image is formed in an appropriate area on a sheet by synchronizing a timing of exposing the photosensitive element to light to draw an electrostatic latent image with a timing of conveying the sheet. Moreover, a tandem image forming apparatus that forms a multiple-color image using a plurality of photosensitive elements adjusts a timing of exposing each of the photosensitive elements for the respective colors to light so that images of the respective colors developed on the photosensitive elements are properly overlaid on one another. Hereinafter, these adjustments are collectively referred to as positional deviation correction.

Concrete methods for performing such positional deviation correction as described above include a mechanical-adjustment-based method and an image-processing-based method. The mechanical-adjustment-based method adjusts positional relationship between a light source for use in exposure of the photosensitive element and the photosensitive element. The image-processing-based method adjusts an image to be formed according to positional deviation, thereby causing the image to be eventually formed at an opportune position. The image-processing-based method is performed by drawing and reading a correction pattern, and making correction based on difference between a timing determined from design and a timing when the pattern is actually read so that an image is formed at a desired position.

Regarding the image-processing-based method, for example, a technique for increasing reading accuracy of a sensor that reads a correction pattern is proposed (see, for example, Japanese Laid-open Patent Application No. 2004-069767. According to the technique disclosed in Japanese Laid-open Patent Application No. 2004-069767, a correction pattern that is larger than a read area of the reading sensor to have a margin or, more specifically, a correction pattern that is large enough to permit reading even when positional deviation should occur, is drawn. After making correction based on this correction pattern, correction is made second time using a correction pattern that is drawn in a size that depends on the read area of the reading sensor. This technique allows excluding, from the correction made second time, an influence of diffused light reflected from the margin portion of the correction pattern, making highly-accurate correction possible.

When a correction pattern is drawn in a size that depends on a read area of a reading sensor as disclosed in Japanese Laid-open Patent Application No. 2004-069767, the size of the drawn pattern simply becomes small. Accordingly, an advantage of decrease in toner consumption can also be obtained. To enhance this advantage, it is desired to minimize the correction pattern drawn with the margin to the read area of the reading sensor.

Meanwhile, when an area where a correction pattern is drawn has no margin to the read area of the reading sensor, possibility that the correction pattern is not detected properly increases. Anomalous detection of the correction pattern leads to the disadvantage that correction of a parameter that is to be corrected based on the correction pattern is not normally performed, and normal device operation is prevented. Thus, there is a trade-off between the reduction in toner consumption and accuracy of device operation owing to normal detection of a correction pattern described above.

Example structures of the correction pattern described above include a structure in which the correction pattern includes four patterns: a registration-timing correction pattern; a color registration error correction pattern; a main-scanning correction pattern; and a density correction pattern. Among the patterns, the registration-timing correction pattern is used not only for a purpose of correcting a drawing position of an entire image in the main-scanning direction, that is, correcting a registration timing, but also for a purpose of correcting a timing of detecting the density correction pattern.

If a registration timing deviates because the registration timing is not corrected properly, a position on a sheet where the image is formed deviates. If, as a result, the image is transferred onto a leading end of the sheet, the sheet can undesirably stick to a fixing roller when the sheet is conveyed to a fixing unit, resulting in paper jam.

If the timing of detecting the density correction pattern is not corrected properly and a detection timing deviates, the density correction pattern is not detected properly, resulting in erroneous density correction. In short, when the registration-timing correction pattern drawn for the multiple purposes is not detected properly, a plurality of inconveniences will be caused, which is highly disadvantageous.

In light of these, there is a need to balance reduction in amount of toner to be consumed to draw correction patterns and a degree of accuracy in device operation.

SUMMARY OF THE INVENTION

It is an object of the present invention to at least partially solve the problems in the conventional technology.

An optical-writing control device controls a plurality of light sources to form electrostatic latent images on a plurality of photosensitive elements. The light sources and the photosensitive elements are provided on a per-color basis of different colors. The optical-writing control device includes: a light-emission control unit that controls each of the plurality of light sources based on information on pixels constituting an image to be formed, thereby exposing each of the plurality of photosensitive elements to light; a detection-signal acquiring unit that acquires a detection signal output from a sensor on a conveying path where developing-agent images obtained by developing the electrostatic latent images formed on the photosensitive elements using developing agents of the different colors are transferred and conveyed; and a correction-value calculating unit that calculates correction values for use in correcting a transfer position at which the developing-agent images are to be transferred onto a sheet, overlaying positions at which the developing-agent images of the different colors are to be overlaid on one another, and densities of the developing-agent images based on the detection signal output from the sensor upon detection of a correction pattern for use in correcting the transfer position, a correction pattern for use in correcting the overlaying positions, and a correction patter for use in correcting the densities. The detection-signal acquiring unit determines a timing of detecting the pattern for use in correcting the overlaying positions and a timing of detecting the pattern for use in correcting the densities based on a correction value calculated based on the detection signal output upon detection of the pattern for use in correcting the transfer position. The light-emission control unit controls light emission from each of the plurality of light sources so as to cause the pattern for use in correcting the overlaying positions to have a width, in a main-scanning direction, that depends on a width in the main-scanning direction of a detection area of the sensor, and controls light emission from each of the light sources so as to cause the pattern for use in correcting the transfer position to have a width, in the main-scanning direction, that is wider than the width in the main-scanning direction of the pattern for use in correcting the overlaying positions.

An image forming apparatus includes the optical-writing control device as described above.

A method of controlling an optical-writing control device that controls a plurality of light sources to form electrostatic latent images on a plurality of photosensitive elements, the light sources and the photosensitive elements being provided on a per-color basis of different colors, the optical-writing control device including: a light-emission control unit that controls each of the plurality of light sources based on information on pixels constituting an image to be formed, thereby exposing each of the plurality of photosensitive elements to light, a detection-signal acquiring unit that acquires a detection signal output from a sensor on a conveying path where developing-agent images obtained by developing the electrostatic latent images formed on the photosensitive elements using developing agents of the different colors are transferred and conveyed, and a correction-value calculating unit that calculates correction values for use in correcting a transfer position at which the developing-agent images are to be transferred onto the sheet, overlaying positions at which the developing-agent images of the different colors are to be overlaid on one another, and densities of the developing-agent images based on detection signals output from the sensor upon detection of a correction pattern for use in correcting the transfer position, a correction pattern for use in correcting the overlaying positions, and a correction patter for use in correcting the densities, the method includes: controlling light emission from each of the plurality of light sources so as to cause the pattern for use in correcting the overlaying positions to have a width, in main-scanning direction, that depends on a width in the main-scanning direction of a detection area of the sensor; controlling light emission from each of the light sources so as to cause the pattern for use in correcting the transfer position to have a width, in the main-scanning direction, that is wider than the width in the main-scanning direction of the pattern for use in correcting the overlaying positions; and determining a timing of detecting the pattern for use in correcting the overlaying positions and a timing of detecting the pattern for use in correcting the densities based on a correction value calculated based on the detection signal output upon detection of the pattern for use in correcting the transfer position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention is described in detail below with reference to the accompanying drawings. The embodiment is described using an image forming apparatus as an example of a multi-function peripheral (MFP). The image forming apparatus according to the embodiment is an electrophotographic image forming apparatus and has a feature in structure of patterns drawn in positional deviation correction for correction of a timing of exposing photosensitive elements to light.

Figure 1:
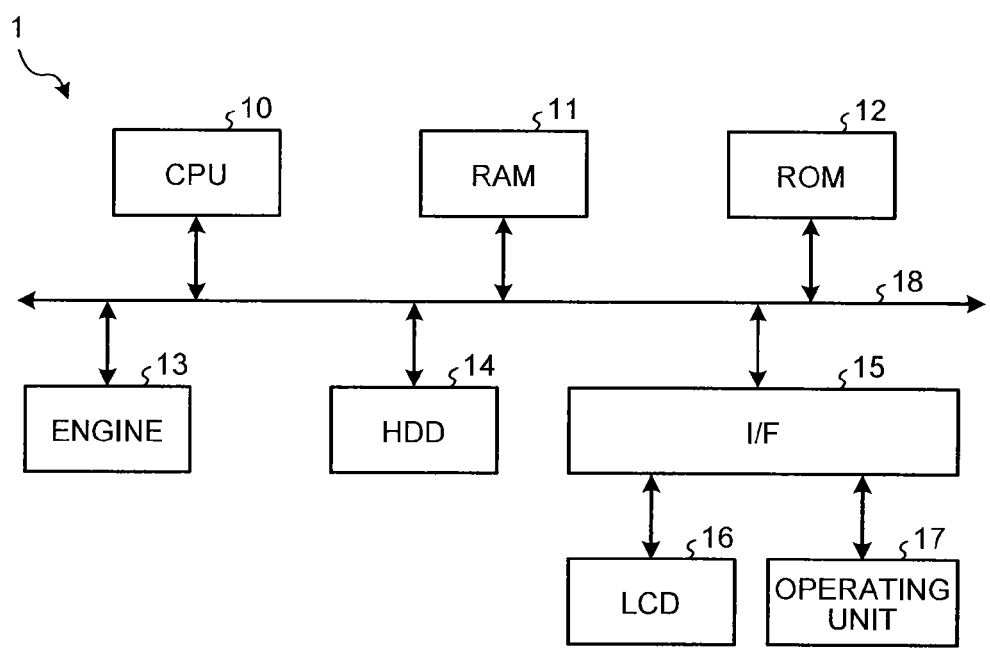
FIG. 1 is a block diagram illustrating a hardware configuration of an image forming apparatus according to an embodiment of the present invention.

FIG. 1 is a block diagram illustrating a hardware configuration of an image forming apparatus 1 according to the embodiment. As illustrated in FIG. 1, the image forming apparatus 1 according to the embodiment has a configuration similar to that of a general server or an information processing terminal such as personal computer (PC), and additionally includes an engine that performs image forming. More specifically, the image forming apparatus 1 according to the embodiment includes a central processing unit (CPU) 10, a random access memory (RAM) 11, a read only memory (ROM) 12, an engine 13, a hard disk drive (HDD) 14, and an interface (I/F) 15 that are connected to one another via a bus 18. A liquid crystal display (LCD) 16 and an operating unit 17 are connected to the I/F 15.

The CPU 10 is a computing unit that controls operations of the entire image forming apparatus 1. The RAM 11 is a volatile storage medium, to and from which information can be written and read at high speed, and is used as a workspace by the CPU 10 when processing information. The ROM 12 is a read-only non-volatile storage medium and stores programs such as firmware. The engine 13 is a mechanism that actually performs image forming in the image forming apparatus 1.

The HDD 14 is a non-volatile storage medium, to and from which information can be written and read, and stores various control programs such as an operating system (OS) and application programs. The I/F 15 connects the bus 18 and various hardware, network, and/or the like and controls these. The LCD 16 is a visual user interface through which a user checks a status of the image forming apparatus 1. The operating unit 17 is a user interface, such as a keyboard and/or a mouse, for inputting information to the image forming apparatus 1.

In such a hardware configuration, programs stored in a storage medium such as the ROM 12, the HDD 14, or an optical disk (not shown) are loaded onto the RAM 11. The CPU 10 performs calculations according to the programs, and thereby a software control unit is implemented. Functional blocks that provide functions of the image forming apparatus 1 according to the embodiment are implemented by a combination of the software control unit implemented as described above and hardware.

Figure 2:
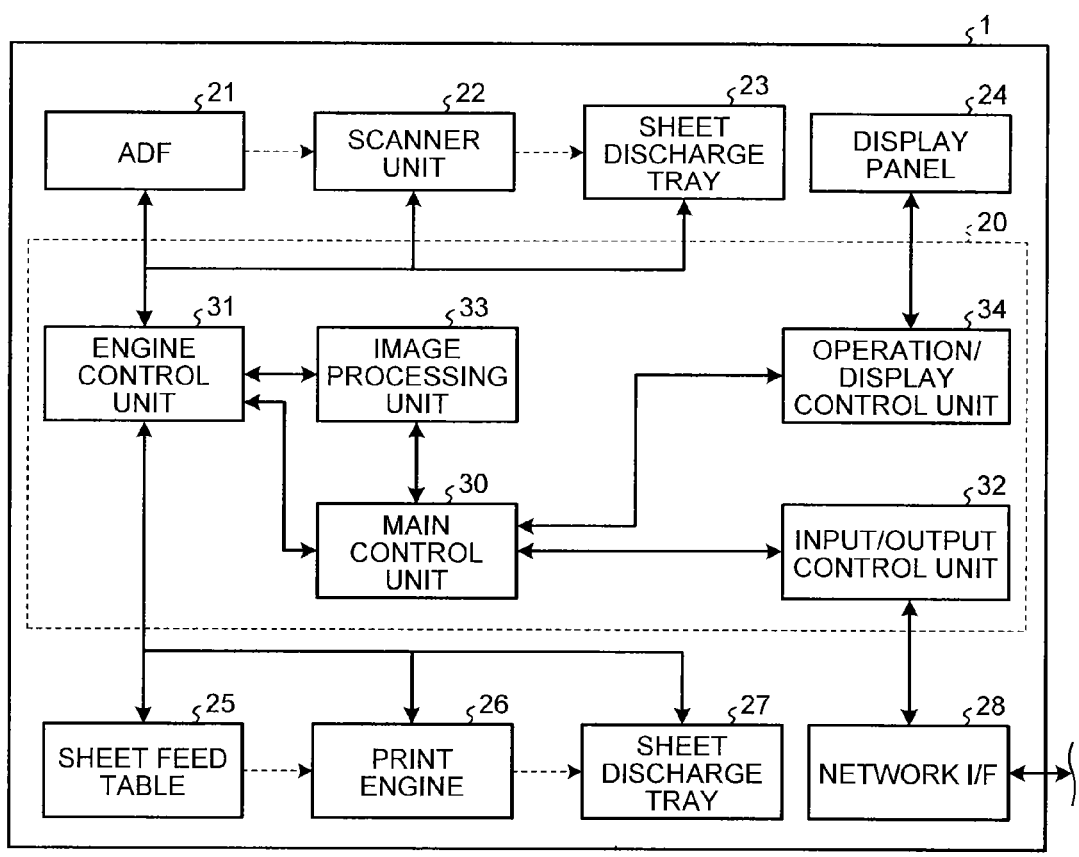
FIG. 2 is a diagram illustrating a functional configuration of the image forming apparatus according to the embodiment.

A functional configuration of the image forming apparatus 1 according to the embodiment is described below with reference to FIG. 2. FIG. 2 is a block diagram illustrating the functional configuration of the image forming apparatus 1 according to the embodiment. As illustrated in FIG. 2, the image forming apparatus 1 according to the embodiment includes a controller 20, an automatic document feeder (ADF) 110, a scanner unit 22, a sheet discharge tray 23, a display panel 24, a sheet feed table 25, a print engine 26, a sheet discharge tray 27, and a network I/F 28.

The controller 20 includes a main control unit 30, an engine control unit 31, an input/output control unit 32, an image processing unit 33, and an operation/display control unit 34. As illustrated in FIG. 2, the image forming apparatus 1 according to the embodiment is configured as an MFP that includes the scanner unit 22 and the print engine 26. In FIG. 2, electrical connections are indicated by solid arrows; sheet flows are indicated by dashed arrows.

The display panel 24 is an output interface that visually displays a status of the image forming apparatus 1 and also an input interface (operating unit) that, as a touch panel, allows a user to directly operate the image forming apparatus 1 or input information to the image forming apparatus 1. The network I/F 28 is an interface, through which the image forming apparatus 1 carries out communications with other equipment over a network. An Ethernet (registered trademark) or universal serial bus (USB) interface can be used as the network I/F 28.

The controller 20 is implemented by a combination of software and hardware. More specifically, a control program, such as firmware, stored in the ROM 12 or a non-volatile memory, or a non-volatile storage medium, such as the HDD 14 or an optical disk, is loaded onto a volatile memory (hereinafter, "memory") such as the RAM 11. The controller 20 is implemented by a combination of the software control unit implemented by calculations performed by the CPU 10 according to the program and hardware such as an integrated circuit. The controller 20 functions as a control unit that controls the entire image forming apparatus 1.

The main control unit 30 has a role of controlling the units included in the controller 20 and issues commands to the units of the controller 20. The engine control unit 31 has a role of a driving unit that controls or drives the print engine 26, the scanner unit 22, and the like. The input/output control unit 32 inputs signals and commands that are input via the network I/F 28, to the main control unit 30. The main control unit 30 controls the input/output control unit 32 to access other equipment via the network I/F 28.

The image processing unit 33 generates drawing information based on print information contained in a print job input to the image forming apparatus 1, under control of the main control unit 30. The drawing information is information for drawing an image to be formed by the print engine 26, which is an image forming unit, by performing an image forming operation. The print information contained in the print job is image information after converted by a print driver installed in an information processing apparatus, such as a PC, to a format recognizable for the image forming apparatus 1. The operation/display control unit 34 displays information on the display panel 24 or gives information input via the display panel 24, to the main control unit 30.

When the image forming apparatus 1 operates as a printer, the input/output control unit 32 receives a print job via the network I/F 28. The input/output control unit 32 transfers the received print job to the main control unit 30. Upon receiving the print job, the main control unit 30 controls the image processing unit 33 to generate drawing information based on print information contained in the print job.

When the drawing information is generated by the image processing unit 33, the engine control unit 31 controls the print engine 26 based on the generated drawing information to perform image forming on a sheet conveyed from the sheet feed table 25. That is, the print engine 26 functions as the image forming unit. The document, on which an image is formed by the print engine 26, is ejected onto the sheet discharge tray 27.

When the image forming apparatus 1 operates as a scanner, the operation/display control unit 34 or the input/output control unit 32 transfers a scanning execution signal to the main control unit 30 according to an operation made by a user on the display panel 24 or a scanning execution command fed from an external PC or the like via the network I/F 28. The main control unit 30 controls the engine control unit 31 based on the received scanning execution signal.

The engine control unit 31 drives the ADF 21 to convey a to-be-imaged original document placed in the ADF 21, to the scanner unit 22. The engine control unit 31 also drives the scanner unit 22 to acquire an image of the document conveyed from the ADF 21. When a document is directly placed on the scanner unit 22 rather than placed in the ADF 21, the scanner unit 22 captures an image of the placed document under control of the engine control unit 31. That is, the scanner unit 22 operates as an image capturing unit.

An image capturing operation is performed as follows. An image capturing device, such as a charge-coupled device (CCD), optically scans a document to acquire optical information, and generates scanned-image information based on the optical information. The engine control unit 31 transfers the scanned-image information generated by the scanner unit 22 to the image processing unit 33. The image processing unit 33 generates image information based on the scanned-image information received from the engine control unit 31, under control of the main control unit 30. The image information generated by the image processing unit 33 is stored in a storage medium such as the HDD 40 mounted on the image forming apparatus 1. That is, the scanner unit 22, the engine control unit 31, and the image processing unit 33 cooperate to function as a document reading unit.

The image information generated by the image processing unit 33 is stored according to an instruction from a user in the HDD 40 or the like or transmitted to external equipment via the input/output control unit 32 and the network I/F 28. That is, the ADF 21 and the engine control unit 31 function as an image input unit.

When the image forming apparatus 1 operates as a copier, the image processing unit 33 generates drawing information based on the scanned-image information received by the engine control unit 31 from the scanner unit 22 or the image information generated by the image processing unit 33. The engine control unit 31 drives the print engine 26 based on the drawing information as in the case where the image forming apparatus 1 operates as a printer.

Figure 3:
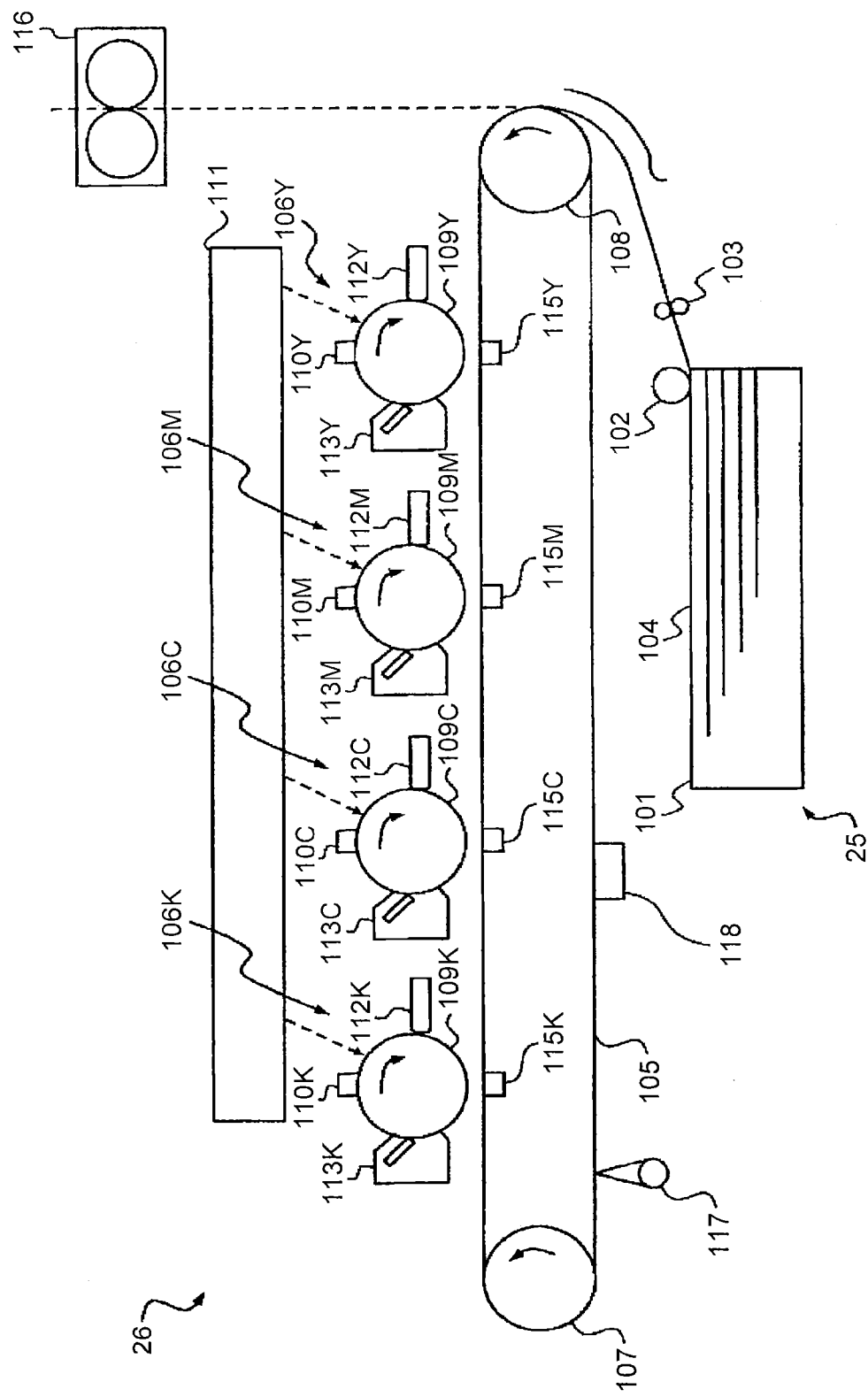
FIG. 3 is a diagram illustrating a configuration of a print engine according to the embodiment.

The configuration of the print engine 26 according to the embodiment is described below with reference to FIG. 3. As illustrated in FIG. 3, the print engine 26 according to the embodiment is of what is referred to as a tandem type and configured such that image forming units 106 for different colors are arranged along a conveying belt 105, which is an endless moving unit. More specifically, the plurality of image forming units (electrophotographic processing units) 106Y, 106M, 106C, and 106K (hereinafter, collectively referred to as "image forming unit 106") are arranged in this order along the conveying belt 105 from upstream in a conveying direction. The conveying belt 105 is an intermediate transfer belt, on which an intermediate transfer image is to be formed. The intermediate transfer image is then transferred onto a sheet (which is an example of a recording medium) 104 separated from sheets in a sheet feed tray 101 and fed by a sheet feed roller 102.

The sheet 104 fed from the sheet feed tray 101 is temporarily stopped by registration rollers 103, and delivered to a transfer position where an image is transferred to the sheet 104 from the conveying belt 105, according to a timing when the image forming units 106 form the image.

The plurality of image forming units 106Y, 106M, 106C, and 106K are identical in internal configuration but differ from one another only in colors of toner images to be formed. The image forming unit 106K forms a black image; the image forming unit 106M forms a magenta image; the image forming unit 106C forms a cyan image; the image forming unit 106Y forms a yellow image. The image forming unit 106Y is specifically described below. Although constituents of the other image forming units 106M, 106C, and 106K that are respectively distinguished by reference symbols "M", "C", and "K" are indicated in the drawings, description about the image forming units 106M, 106C, and 106K is omitted. This is because the image forming units 106M, 106C, and 106K are similar to the image forming unit 106Y.

The conveying belt 105 is an endless belt supported in an tensioned manner on and around a driving roller 107 that is driven to rotate and a driven roller 108. The driving roller 107 is driven to rotate by a drive motor (not shown). The drive motor, the driving roller 107, and the driven roller 108 function as a driving unit that moves the conveying belt 105, which is the endless moving unit.

During image forming, the first image forming unit 106Y transfers a yellow toner image onto the conveying belt 105 that is rotated. The image forming unit 106Y includes a photosensitive drum 109Y which is a photosensitive element, and an electrostatic charging unit 110Y, an optical writing device 200, a developing unit 112Y, a photosensitive element cleaner (not shown), and an electrostatic neutralizer 113Y that are arranged around the photosensitive drum 109Y. The optical writing device 200 is configured to emit light onto each of the photosensitive drums 109Y, 109M, 109C, and 109K (hereinafter, collectively referred to as "photosensitive drum 109").

In image forming, an outer circumferential surface of the photosensitive drum 109Y is uniformly electrostatically charged by the electrostatic charging unit 110Y in a dark condition. Thereafter, the outer circumferential surface is exposed to light from a light source of the optical writing device 200 according to a yellow image, whereby an electrostatic latent image is formed. The developing unit 112Y develops the electrostatic latent image with yellow toner into a visible image. A yellow toner image is thus formed on the photosensitive drum 109Y.

The toner image is transferred onto the conveying belt 105 by action of a transfer device 115Y at the position (transfer position) where the photosensitive drum 109Y and the conveying belt 105 contact or are closest to each other. This transfer causes the yellow toner image to be formed on the conveying belt 105. The photosensitive element cleaner wipes residual toner remaining on the photosensitive drum 109Y, from which the toner image has been transferred. Thereafter, the photosensitive drum 109Y is neutralized by the electrostatic neutralizer 113Y and becomes on standby for next image forming.

The yellow toner image transferred onto the conveying belt 105 by the image forming unit 106Y as described above is conveyed to the next image forming unit 106M by rotation of the rollers of the conveying belt 105. In the image forming unit 106M, a magenta toner image is formed on the photosensitive drum 109M through an image forming process similar to that performed in the image forming unit 106Y. This toner image is transferred to be superimposed on the already-formed yellow image.

The yellow and magenta toner images transferred onto the conveying belt 105 are conveyed to further next image forming units 106C and 106K, where a cyan toner image formed on the image photosensitive drum 109C and a black toner image formed on the photosensitive drum 109K are respectively transferred to be superimposed on the already-transferred images by similar operations. Thus, a full-color intermediate transfer image is formed on the conveying belt 105.

The sheets 104 housed in the sheet feed tray 101 are fed out sheet by sheet from uppermost one of the sheets 104. The intermediate transfer image formed on the conveying belt 105 is transferred onto the sheet 104 at a position where a conveying path of the sheet 104 contacts or is closest to the conveying belt 105. As a result, the image is formed on the sheet 104. The sheet 104, on which the image is formed, is further conveyed to a fixing unit 116, in which the image is fixed. Thereafter, the sheet 104 is ejected to the outside of the image forming apparatus.

In the image forming apparatus 1 configured as described above, misregistration between the colors can occur such that toner images of the respective colors are not overlaid on one another at an intended overlaying position. Possible causes of this color misregistration include: error of shaft center distance between the photosensitive drums 109Y, 109M, 109C, and 109K; error of parallelism of the photosensitive drums 109Y, 109M, 109C, and 109K; installation error of light-emitting diode arrays (LEDAs) 130 in the optical writing device 111; and a write-timing error in writing electrostatic latent images to the photosensitive drums 109Y, 109M, 109C, and 109K.

Due to the similar cause, an image may be transferred to an area that does not fall within an area to which the image should be transferred on a transfer-target sheet. Known primary components of such positional deviation include skew and registration error in the sub-scanning direction. Expansion/contraction of the conveying belt resulting from changes in temperature in the apparatus and/or over-time deterioration is also known.

A pattern detection sensor 117 is provided to correct such positional deviation. The pattern detection sensor 117 is an optical sensor for reading a positional-deviation correction pattern and a density correction pattern transferred onto the conveying belt 105 by the photosensitive drums 109Y, 109M, 109C, and 109K. The pattern detection sensor 117 includes a light-emitting device for emitting light onto the pattern drawn on the surface of the conveying belt 105 and a light-receiving device for receiving light reflected from the correction pattern. As illustrated in FIG. 3, the pattern detection sensor 117 is supported on a single substrate along a direction perpendicular to the conveying direction of the conveying belt 105 and at downstream of the photosensitive drums 109Y, 109M, 109C, and 109K.

In the image forming apparatus 1, density of the image transferred onto the sheet 104 can vary depending on change in state of the image forming unit 106Y, 106M, 106C, or 106K and/or change in state of the optical writing device 111. To correct such variation in density, density correction is performed by forming the density correction pattern according to a preset rule, detecting the density correction pattern, and correcting drive parameters of the image forming units 106Y, 106M, 106C, and 106K and/or a drive parameter of the optical writing device 111 based on a detection result.

The pattern detection sensor 117 is used not only in the positional-deviation correcting operation that includes detecting the positional-deviation correction pattern described above but also in detection of the density correction pattern. Details of the pattern detection sensor 117, and modes of the positional deviation correction and the density correction will be described later.

A belt cleaner 118 is provided to remove toner of the correction pattern drawn on the conveying belt 105 for such drawing parameter correction as described above, thereby preventing a sheet conveyed by the conveying belt 105 from being stained. As illustrated in FIG. 3, the belt cleaner 118 is a cleaning blade pressed against the conveying belt 105 at downstream of the pattern detection sensor 117 and upstream of the photosensitive drums 109. The belt cleaner 118 is a developing-agent removing unit that scrapes off toner sticking onto the surface of the conveying belt 105.

Figure 4:
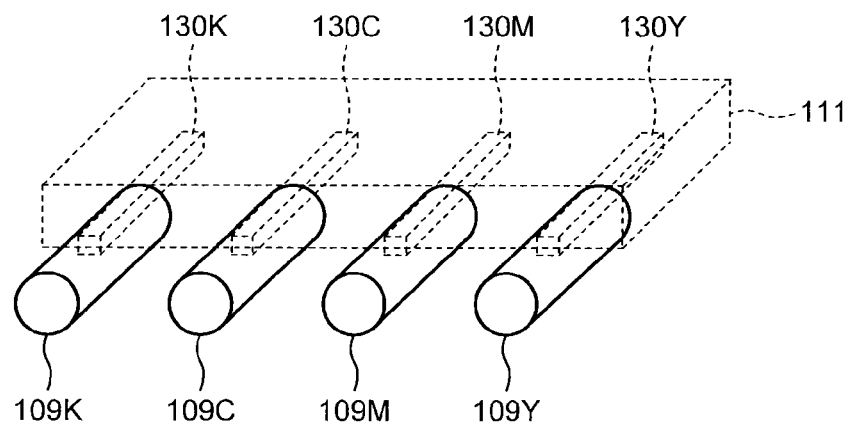
FIG. 4 is a diagram illustrating a configuration of an optical writing device according to the embodiment.

The optical writing device 111 according to the embodiment is described below. FIG. 4 is a diagram illustrating a positional relationship between the optical writing device 111 and the photosensitive drums 109 according to the embodiment. As illustrated in FIG. 4, illumination light, with which the photosensitive drums 109Y, 109M, 109C, and 109K of the respective colors are illuminated, is emitted from the LEDAs 130Y, 130M, 130C, and 130K (hereinafter, collectively referred to as "LEDA 130"), which are light sources.

The LEDA 130 includes LEDs, which are light-emitting devices, arranged in the main-scanning direction of the photosensitive drum 109. A control unit included in the optical writing device 111 forms an electrostatic latent image by controlling light-on/off state of each of the LEDs arranged in the main-scanning direction based on drawing information fed from the controller 20 to selectively expose the surface of the photosensitive drum 109 to light.

Figure 5:
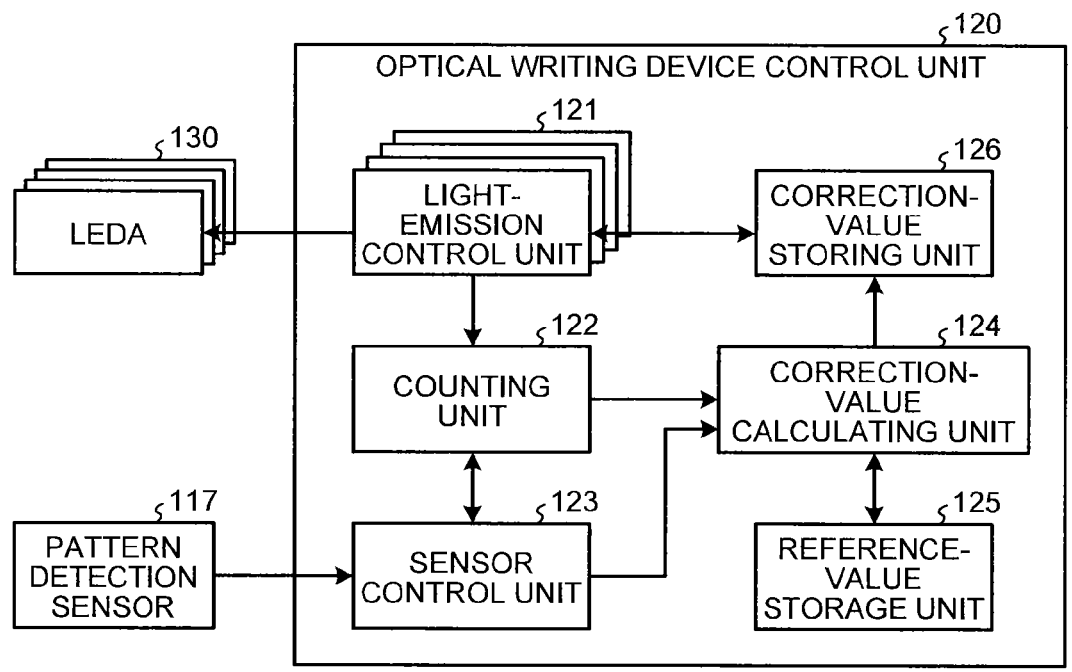
FIG. 5 is a block diagram illustrating a configuration of an optical-writing control unit and LEDAs according to the embodiment.

Control blocks of the optical writing device 111 according to the embodiment are described below with reference to FIG. 5. FIG. 5 is a diagram illustrating a functional configuration of an optical-writing-device control unit 120 that controls the optical writing device 111 according to the embodiment and connection relationship with the LEDAs 130 and the pattern detection sensor 117.

As illustrated in FIG. 5, the optical-writing-device control unit 120 according to the embodiment includes light-emission control units 121, a counting unit 122, a sensor control unit 123, a correction-value calculating unit 124, a reference-value storing unit 125, and a correction-value storing unit 126. The optical writing device 111 according to the embodiment includes such an information processing mechanism as that described above with reference to FIG. 1 including the CPU 10, the RAM 11, the ROM 12, and the HDD 14. The optical-writing-device control unit 120 illustrated in FIG. 5 is implemented, as is the controller 20 of the image forming apparatus 1, by loading a control program stored in the ROM 12 or the HDD 14 onto the RAM 11 and executing the control program under control of the CPU 10.

The light-emission control unit 121 is a light-source control unit that controls the LEDA 130 based on image information input from the engine control unit 31 of the controller 20. That is, the light-emission control unit 121 also functions as a pixel-information acquiring unit. The light-emission control unit 121 causes the LEDA 130 to emit light in cycles of a predetermined line period, thereby performing optical writing onto the photosensitive drum 109.

The line period, in units of which the light-emission control unit 121 controls light emission from the LEDA 130, depends on an output resolution of the image forming apparatus 1. When performing scaling in the sub-scanning direction based on a ratio to a sheet conveying velocity, the light-emission control unit 121 performs scaling in the sub-scanning direction by adjusting the line period.

The light-emission control unit 121, which drives the LEDA 130 based on drawing information input from the engine control unit 31, also controls light emission from the LEDA 130 to draw the correction patterns in the drawing-parameter correcting process described above.

As described above with reference to FIG. 4, there are provided the plurality of LEDAs 130 that are associated with the respective colors. Accordingly, as illustrated in FIG. 5, the plurality of light-emission control units 121 associated with the respective LEDAs 130 are provided. A correction value generated as a result of positional deviation correction, which is a part of the drawing-parameter correcting process, is stored in the correction-value storing unit 126 illustrated in FIG. 5 as a positional-deviation correction value. The light-emission control unit 121 corrects a timing of driving the LEDA 130 based on the positional-deviation correction value stored in the correction-value storing unit 126.

More specifically, the light-emission control unit 121 corrects the timing of driving the LEDA 130 by delaying a timing of driving the LEDA 130 to emit light based on the drawing information fed from the engine control unit 31 in units of the line period, that is, by shifting a line. Meanwhile, the drawing information is constantly fed from the engine control unit 31 every predetermined period. Accordingly, to delay the light emission timing by shifting a line, it is necessary to hold the input drawing information to delay a timing of reading out the drawing information.

For this purpose, the light-emission control unit 121 includes a line buffer memory, which is a storage medium for holding the drawing information that is fed on a per-main-scan-line basis, and holds the drawing information fed from the engine control unit 31 by storing it in the line buffer memory.

The counting unit 122 starts counting when the light-emission control unit 121 controls the LEDA 130 to start exposure of the photosensitive drum 109K in the positional deviation correction. The counting unit 122 acquires a detection signal output from the sensor control unit 123 based on an output signal of the pattern detection sensor 117 when the positional-deviation correction pattern is detected. The counting unit 122 also inputs, to the correction-value calculating unit 124, a count value at a timing when the counting unit 122 acquires the detection signal. Thus, the counting unit 122 functions as a detection-timing acquiring unit that acquires information on a detection timing of the pattern.

The sensor control unit 123 is a control unit that controls the pattern detection sensor 117. As described above, the sensor control unit 123 outputs a detection signal when it is determined that the positional-deviation correction pattern formed on the conveying belt 105 has reached the position of the pattern detection sensor 117 based on the output signal of the pattern detection sensor 117. That is, the sensor control unit 123 functions as a detection-signal acquiring unit that acquires a detection signal output from the pattern detection sensor 117 upon detection of a pattern.

As for density correction using the density correction pattern, the sensor control unit 123 acquires signal strengths of output signals of the pattern detection sensor 117, and inputs the signal strengths to the correction-value calculating unit 124. Furthermore, the sensor control unit 123 adjusts timings of detecting the density correction pattern according to a result of detection of the positional-deviation correction pattern.

The correction-value calculating unit 124 calculates correction values based on the count value acquired from the counting unit 122, the signal strengths acquired from the sensor control unit 123 as the result of detection of the density correction pattern, and reference values for positional deviation correction and density correction stored in the reference-value storing unit 125. That is, the correction-value calculating unit 124 functions as a reference-value acquiring unit and a correction-value calculating unit. The reference-value storing unit 125 stores the reference values for use in these calculations.

Figure 6:
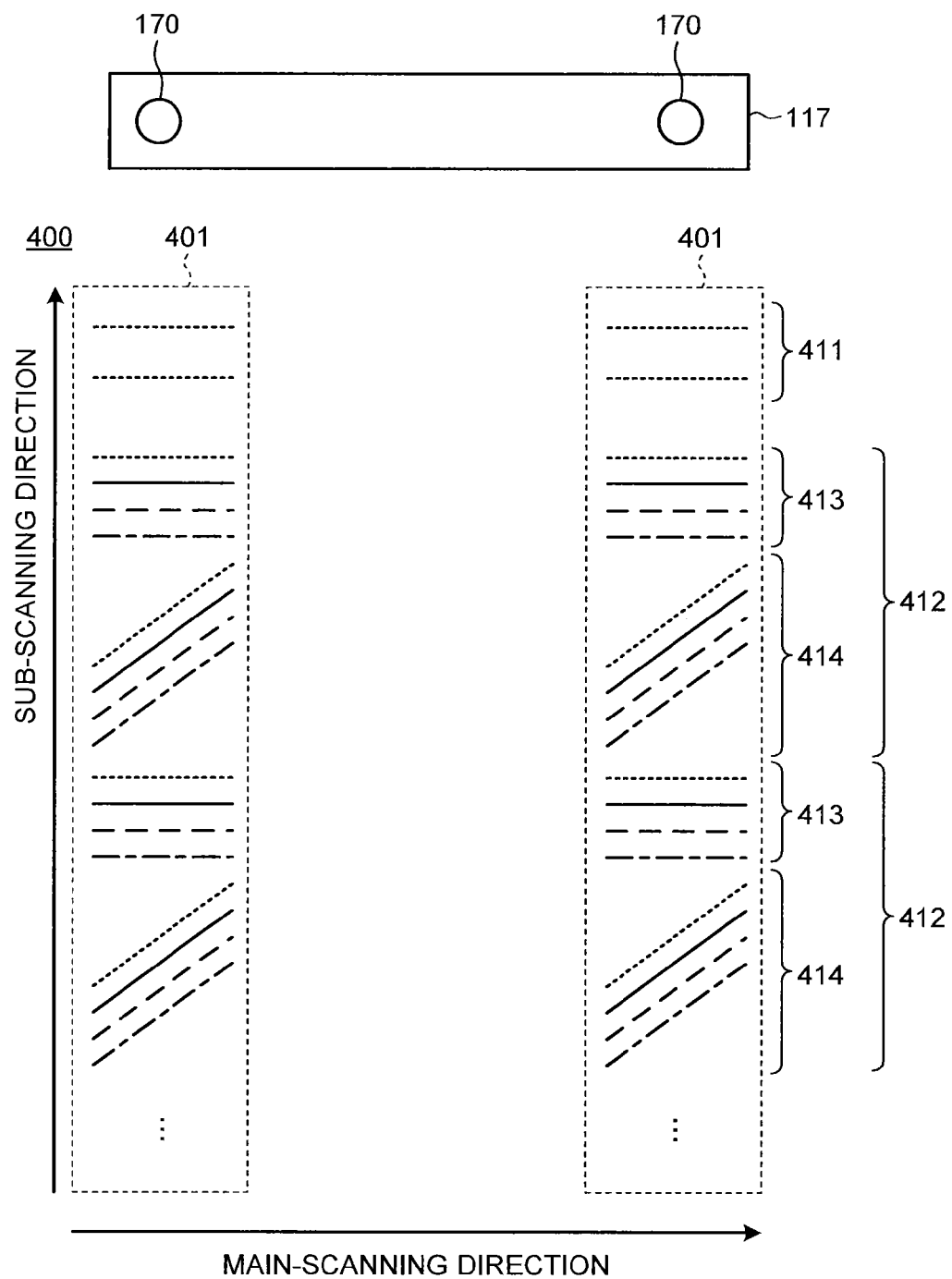
FIG. 6 is a diagram illustrating an example of conventional positional-deviation correction patterns.

The positional-deviation correcting operation using the positional-deviation correction pattern is described below. A positional-deviation correcting operation according to a conventional technique is described below prior to description about the positional-deviation correcting operation according to the embodiment. FIG. 6 is a diagram illustrating a mark (hereinafter, "positional-deviation correction mark") drawn on the conveying belt 105 by the LEDAs 130 controlled by the light-emission control units 121 in the positional-deviation correcting operation according to the conventional technique.

As illustrated in FIG. 6, a positional-deviation correction mark 400 according to the conventional technique includes a plurality of (in the embodiment, two) positional-deviation correction pattern columns 401 arranged in the main-scanning direction, and various patterns are arranged in the sub-scanning direction in each of the positional-deviation correction pattern columns 401. In FIG. 6, solid lines indicate patterns drawn by the photosensitive drum 109K; dotted lines indicate patterns drawn by the photosensitive drum 109C; dashed lines indicate patterns drawn by the photosensitive drum 109C; alternate long and short dashed lines indicate patterns drawn by the photosensitive drum 109M.

As illustrated in FIG. 6, the pattern detection sensor 117 includes a plurality of (in the embodiment, two) sensing elements 170 arranged in the main-scanning direction. Each of the positional-deviation correction pattern columns 401 is drawn at a position conforming to one of the sensing elements 170. This configuration allows the optical-writing control unit 120 to detect the patterns at the plurality of positions in the main-scanning direction and, accordingly, it becomes possible to correct a skew of an image to be formed. It also becomes possible to increase accuracy in correction by averaging detection results output from the plurality of sensing elements 170.

As illustrated in FIG. 6, the positional-deviation correction pattern column 401 includes an overall-position correction pattern 411 and drum-spacing correction patterns 412. As illustrated in FIG. 6, the drum-spacing correction pattern 412 is repeatedly drawn.

The overall-position correction pattern 411 according to the conventional technique is made up of lines parallel to the main-scanning direction drawn by the photosensitive drum 109Y as illustrated in FIG. 6. The overall-position correction pattern 411 is a pattern drawn to acquire count values for use in correcting positional deviation of an entire image in the sub-scanning direction or, in other words, correcting a transfer position at which the image is transferred on a sheet. The overall-position correction pattern 411 is also used in correcting a timing of when the sensor control unit 123 is to detect the drum-spacing correction pattern 412 and the density correction pattern, which will be described later.

In overall position correction using the overall-position correction pattern 411, the optical-writing-device control unit 120 performs an operation of correcting a write-start timing based on a read signal output from the pattern detection sensor 117 by reading the overall-position correction pattern 411.

The drum-spacing correction pattern 412 is a pattern drawn to acquire count values for use in correcting deviation in timings of when the photosensitive drums 109 are to perform drawing or, in other words, correcting positions where images of the respective colors are to be overlaid on one another. As illustrated in FIG. 6, the drum-spacing correction pattern 412 includes a sub-scanning-direction correction pattern 413 and a main-scanning-direction correction pattern 414. As illustrated in FIG. 6, the drum-spacing correction patterns 412 are made up of repetitions of the sub-scanning-direction correction pattern 413 and the main-scanning-direction correction pattern 414, each of which is a set of pattern bands of the respective colors (C, M, Y, and K).

The optical-writing-device control unit 120 corrects positional deviation in the sub-scanning direction of each of the photosensitive drums 109Y, 109M, 109C, and 109K based on read signals output from the pattern detection sensor 117 by reading the sub-scanning-direction correction pattern 413, and corrects positional deviation in the main-scanning direction of each of the photosensitive drums based on read signals output from the pattern detection sensor 117 by reading the main-scanning-direction correction pattern 414.

Figure 7:
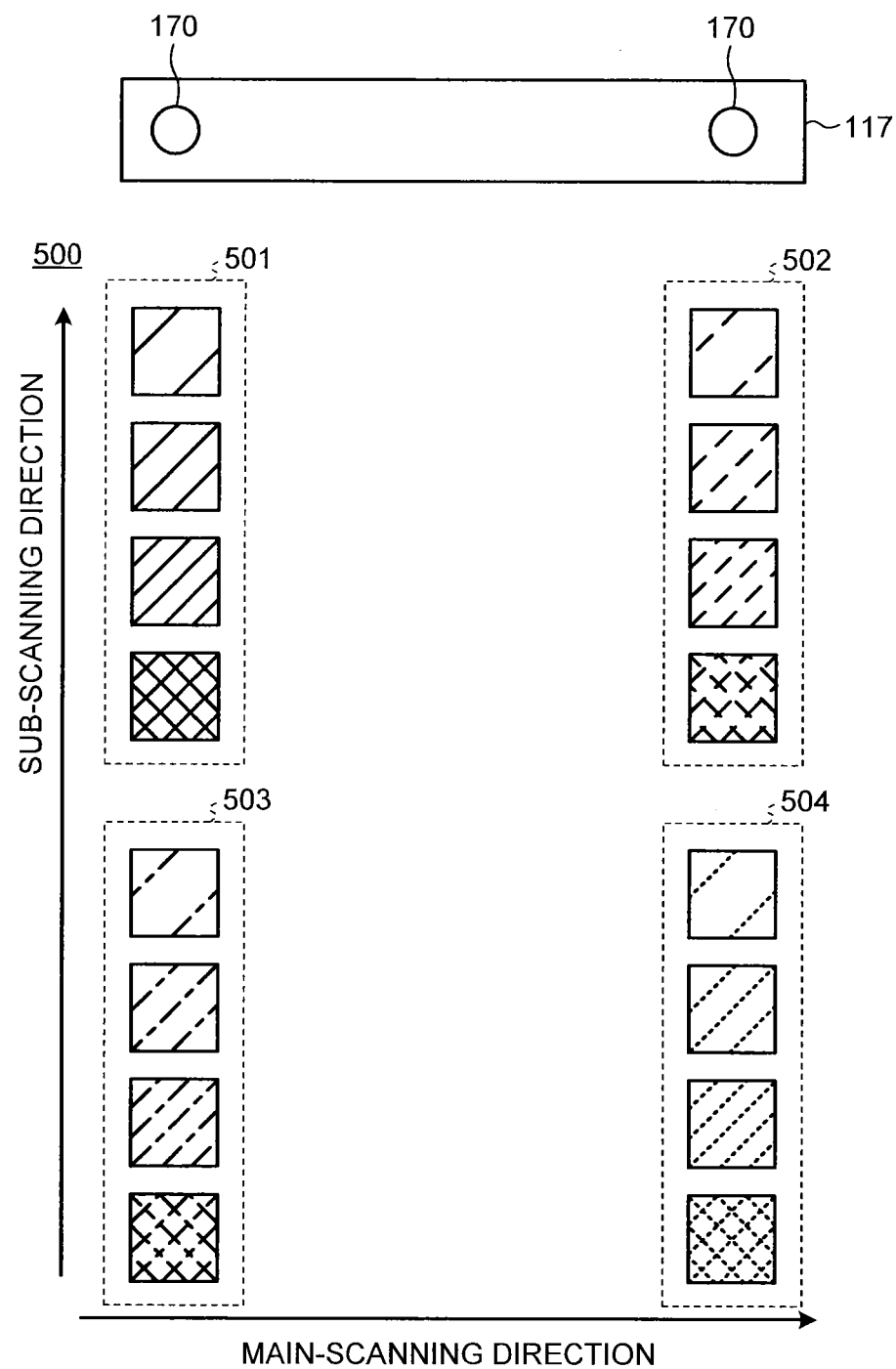
FIG. 7 is a diagram illustrating an example of density correction patterns according to the embodiment.

A density correcting operation according to the embodiment is described below with reference to FIG. 7. FIG. 7 is a diagram illustrating a mark (hereinafter, "density correction mark") drawn on the conveying belt 105 by the LEDAs 130 controlled by the light-emission control units 121 in the density correcting operation according to the embodiment. As illustrated in FIG. 7, a density correction mark 500 according to the embodiment includes a black gradation pattern 501, a cyan gradation pattern 502, a magenta gradation pattern 503, and a yellow gradation pattern 504.

In the embodiment, each of the gradation patterns of the respective colors contained in the density correction mark 500 is made up of four rectangular pattern patches that differ in density. The rectangular pattern patches are arranged in order of density in the sub-scanning direction. The gradation patterns of the respective colors are divided into a group of black and magenta and a group of cyan and yellow, which are drawn at the left and the right, respectively. In FIG. 7, the number of lines of hatching of each rectangular pattern patch represents density of the pattern patch.

Density correction using the density correction mark 500 illustrated in FIG. 7 is performed as follows. The correction-value calculating unit 124 acquires information indicating densities from the sensor control unit 123, and corrects developing biases. The densities are based on signal strengths of the read signals output from the pattern detection sensor 117 by reading the gradation patterns of the respective colors. Of the reference values stored in the reference-value storing unit 125, reference values used in the density correction are reference values, each of which serves as a density reference of one of the four pattern patches of different densities of each of the gradation patterns of the respective colors.

Figure 8:
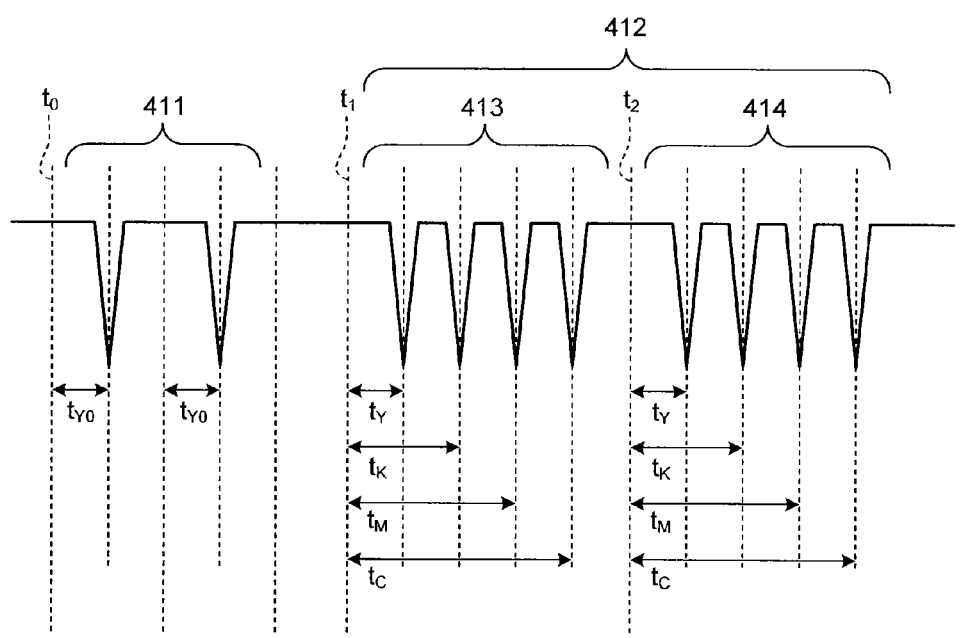
FIG. 8 is a diagram illustrating an example of timings when positional-deviation correction patterns according to the embodiment are detected.

Timing reference values for the respective colors stored in the reference-value storing unit 125 are described below with reference to FIG. 8. FIG. 8 is a diagram illustrating timings when the overall-position correction pattern 411 and the drum-spacing correction pattern 412 are detected. As illustrated in FIG. 8, a detection period $t_{y0}$ of the overall-position correction pattern 411 is a detection period from a detection-start timing $t_0$, which is a timing before each line drawn by the photosensitive drum 109Y is read out.

Detection periods $t_Y$, $t_K$, $t_M$, and $t_C$ of the sub-scanning-direction correction pattern 413 and detection periods $t_Y$, $t_K$, $t_M$, and $t_C$ of the main-scanning-direction correction pattern 414 contained in the drum-spacing correction pattern 412 are detection periods from a detection-start timing $t_1$ and a detection-start timing $t_2$, respectively. Each of the detection-start timings $t_1$ and $t_2$ is a timing before a set of the pattern patches is read out.

The reference-value storing unit 125 stores reference values of the detection period $t_{y0}$ of the overall-position correction pattern 411 and the detection periods $t_Y$, $t_K$, $t_M$, and $t_C$ of the sub-scanning-direction correction pattern 413 and the main-scanning-direction correction pattern 414 illustrated in FIG. 8. In other words, the reference-value storing unit 125 stores theoretical values, which are values when detailed structure of the parts of the image forming apparatus are as intended by design, of the detection period $t_{y0}$ of the overall-position correction pattern 411 and the detection periods $t_Y$, $t_K$, $t_M$, and $t_C$ of the sub-scanning-direction correction pattern 413 and the main-scanning-direction correction pattern 414 as the reference values.

More specifically, the correction-value calculating unit 124 calculates differences between the respective reference values stored in the reference-value storing unit 125 and the detection periods $t_Y$, $t_K$, $t_M$, and $t_C$ illustrated in FIG. 8, thereby calculating deviations from design values of the image forming apparatus, on which the correction-value calculating unit 124 is mounted. The correction-value calculating unit 124 calculates correction values for use in correcting light emission timings of the LEDAs 130 based on the deviations.

The reference value of the detection period $t_{y0}$ of the overall-position correction pattern 411 is used also in correcting the detection-start timings $t_1$ and $t_2$ illustrated in FIG. 8. More specifically, the correction-value calculating unit 124 calculates correction values for use in correcting the detection-start timings $t_1$ and $t_2$ illustrated in FIG. 8 based on a difference between the detection period $t_{y0}$ of the overall-position correction pattern 411 and the reference value thereof. This correction can increase accuracy in detection period of the drum-spacing correction pattern 412.

In detection of the positional-deviation correction mark 400 or the density correction mark 500, the pattern detection sensor 117 detects intensities of reflection light obtained by emitting spot light from the pattern detection sensor 117 and receiving light reflected from the mark 400 or 500. In this detection, light intensities of light reflected from the positional-deviation correction mark 400 are not necessarily of high accuracy. This is because the positional-deviation correction mark 400 is used to correct positional deviation of an image to be formed based on detection timing of the pattern.

By contrast, to perform highly-accurate density correction, it is required that light intensities of light reflected from the density correction mark 500 be of high accuracy. This is because the density correction mark 500 is used to correct densities of the image based on the light intensities of the reflection light. Accordingly, when detecting the density correction mark 500, it is necessary to drive the pattern detection sensor 117 so that the spot of light emitted from the pattern detection sensor 117 falls within an area of the density correction mark 500 without straddling the area of the density correction mark 500 and a background-color area of the conveying belt 105.

Driving the pattern detection sensor 117 in this manner can be achieved easily by drawing the density correction mark 500 larger so that a diameter of the spot falls within the pattern area even when small-scale timing error should occur. However, the larger the density correction mark 500 to be drawn, the higher toner consumption. Accordingly, it is desired to draw the density correction mark 500 as small as possible and, most preferably, in a minimum area necessary to contain the spot diameter of the pattern detection sensor 117 therein.

To appropriately read the density correction mark 500 that is minimum as described above with the pattern detection sensor 117, timings of detecting the density correction mark 500 are corrected based on a difference between the detection period $t_{y0}$ of the overall-position correction pattern 411 and the reference value thereof. This correction allows detecting the density correction mark 500 appropriately even when the size of the drawn density correction mark 500 is a minimum size with respect to the spot of light emitted from the pattern detection sensor 117.

Meanwhile, the timings of detecting the density correction mark 500 are corrected based on a difference between the detection period $t_{y0}$ of the overall-position correction pattern 411 and the reference value thereof not only when the density correction mark 500 is drawn in the minimum size with respect to the spot of light emitted from the pattern detection sensor 117.

As described above, the overall-position correction pattern 411 is used not only for the purpose of correcting positional deviation of the entire image in the sub-scanning direction but also used for the purpose of correcting the detection-start timings t1 and t2 illustrated in FIG. 8 and for the purpose of correcting timings of detecting the density correction mark 500.

Accordingly, if the overall-position correction pattern 411 is not detected accurately, each of the purposes will not be attained. More specifically, not only positional deviation of the entire image in the sub-scanning direction is not corrected properly, but also accuracy in detection of the drum-spacing correction pattern 412 deteriorates due to errors of the detection-start timings $t_1$ and $t_2$ and accuracy in density correction deteriorates due to errors of the timings of detecting the density correction mark 500.

In particular, when a registration error of a sheet occurs because deviation of the entire image in the sub-scanning direction is not corrected properly, a toner image can be transferred to a leading end portion of the sheet in the conveying direction. When this sheet is delivered to the fixing unit 116 illustrated in FIG. 3, the toner image transferred onto the leading end of the sheet can cause the sheet to stick to the fixing roller of the fixing unit 116, and result in paper jam.

Meanwhile, the positional-deviation correction mark 400 is drawn each time the positional-deviation correcting operation is repeatedly performed at predetermined timings. Therefore, it is required to minimize an area where the positional-deviation correction mark 400 is drawn to reduce toner consumption. For this reason, it is ideal that each pattern has the width in the main-scanning direction that corresponds to a detection area of the sensing element 170 as illustrated in FIG. 9.

However, in actuality, a drawn pattern can deviate in the main-scanning direction. Accordingly, if the pattern that is drawn to have a small margin in the main-scanning direction with respect to the detection area of the sensing element 170 deviates in the main-scanning direction, a signal-to-noise (S/N) ratio of an output signal of the sensing element 170 can degrade, which can cause a detection error.

Figure 9:
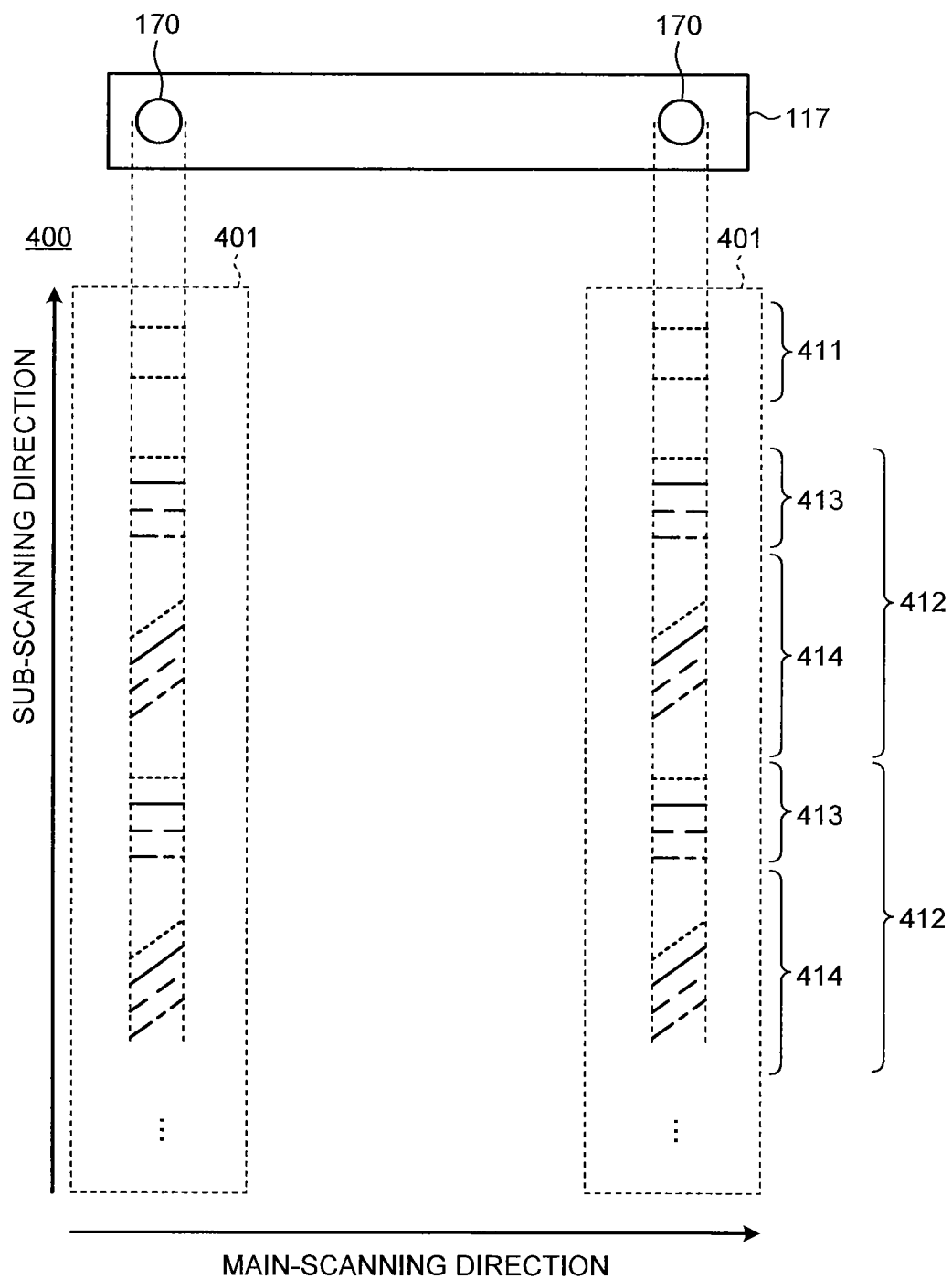
FIG. 9 is a diagram illustrating ideal positional-deviation correction patterns.
Figure 10:
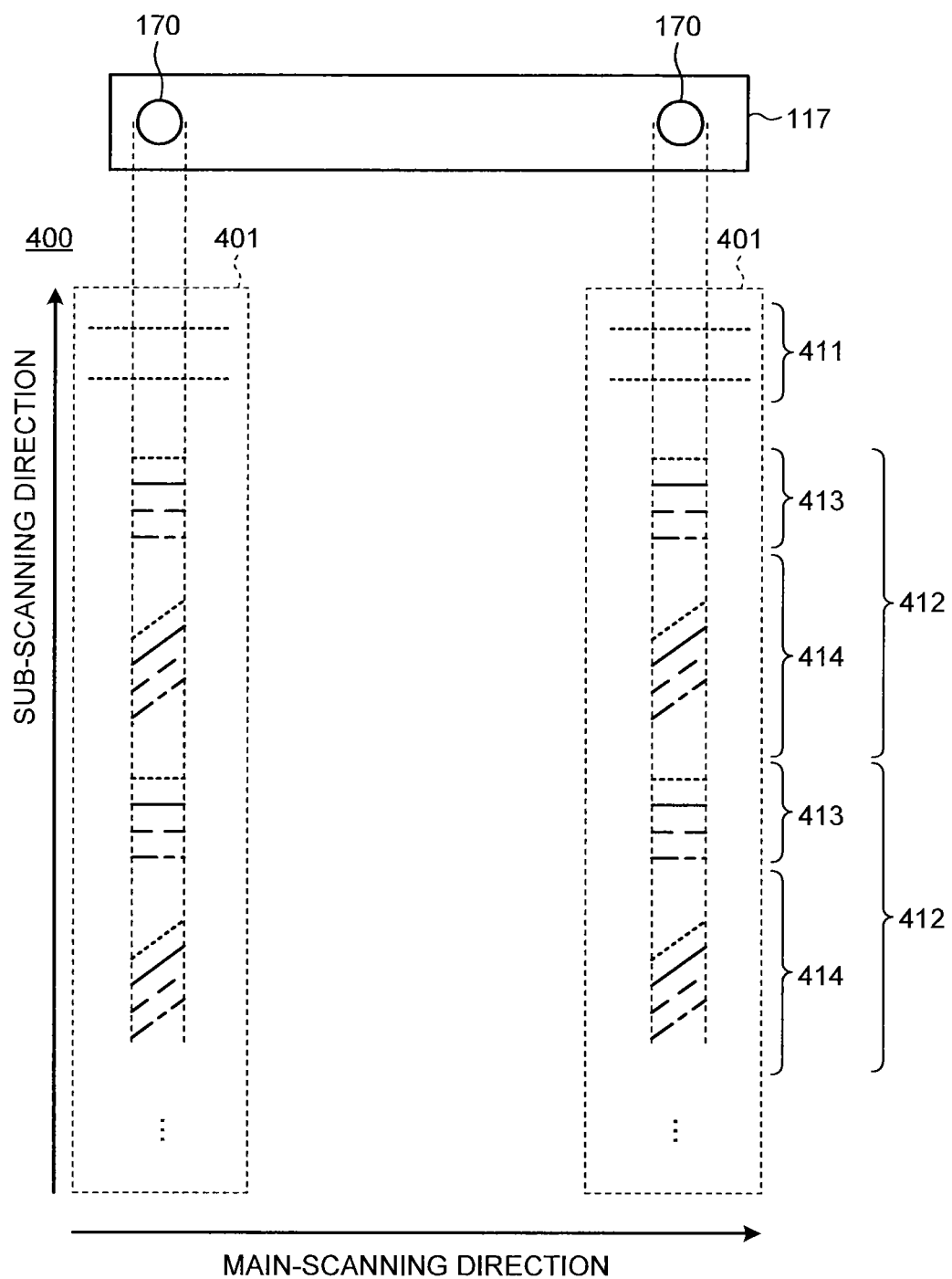
FIG. 10 is a diagram illustrating an example of the positional-deviation correction patterns according to the embodiment.

Meanwhile, as illustrated in FIG. 10, the positional-deviation correction mark 400 drawn in the positional-deviation correcting operation according to the embodiment is drawn such that only the overall-position correction pattern 411 has a margin with respect to the detection area of the sensing element 170 but the other patterns have a width that corresponds to the detection area of the sensing element 170 as in FIG. 9.

Using the positional-deviation correction mark 400 configured as illustrated in FIG. 10 allows reading the overall-position correction pattern 411 accurately even when a position where the pattern is drawn deviates in the main-scanning direction. As a result, it becomes possible to accurately perform correcting the positional deviation of the entire image in the sub-scanning direction, correcting the detection-start timings $t_1$ and $t_2$, and correcting the timing of detecting the density correction mark 500.

Meanwhile, as illustrated in FIG. 10, the drum-spacing correction pattern 412 of the positional-deviation correction mark 400 according to the embodiment is drawn to have a width that corresponds to the detection area of the sensing element 170. Accordingly, such degradation in the S/N ratio of a sensor output signal and a detection error as those described above can occur when the position where the pattern is drawn deviates in the main-scanning direction.

Figure 11:
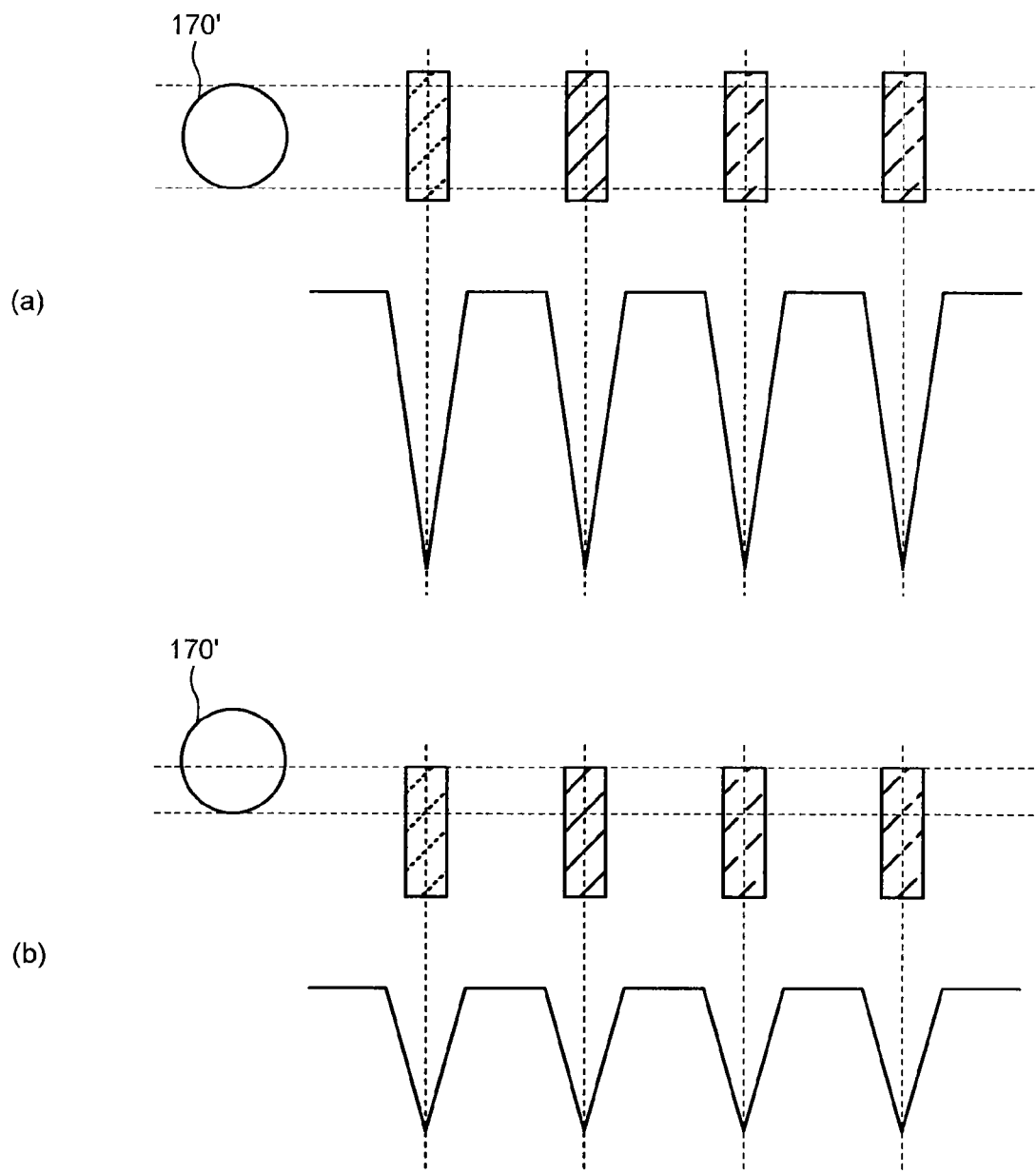
FIG. 11 is a diagram illustrating relationship between position of the positional-deviation correction pattern in the main-scanning direction and detection signal.

A detrimental effect caused by deviation in positions in the main-scanning direction where the sub-scanning-direction correction pattern 413 and the main-scanning-direction correction pattern 414 contained in the drum-spacing correction pattern 412 are drawn are described below. FIGS. 11(a) and 11(b) are diagrams each illustrating relationship between a position of the sub-scanning-direction correction pattern 413 with respect to a detection area 170' of the sensing element 170, and detection signal. The vertical direction corresponds to the main-scanning direction and the horizontal direction corresponds to the sub-scanning direction in FIGS. 11(a) and 11(b).

FIG. 11(a) is a diagram illustrating the relationship in a situation where the sub-scanning-direction correction pattern 413 is drawn at a normal position with respect to the detection area 170' of the sensing element 170. As illustrated in FIG. 11(a), when the sub-scanning-direction correction pattern 413 is drawn at the normal position with respect to the detection area 170', in each of pattern bands, a detection signal peaks at a timing when a center in the conveying direction of a portion of the pattern band that falls within the detection area 170' reaches a center of the detection area 170'.

FIG. 11(b) is a diagram illustrating the relationship in a situation where the sub-scanning-direction correction pattern 413 is drawn at a position deviating in the main-scanning direction with respect to the detection area 170' of the sensing element 170. As illustrated in FIG. 11(b), when the sub-scanning-direction correction pattern 413 is drawn at the position deviating in the main-scanning direction with respect to the detection area 170', a detection signal has a weaker peak. This is because a portion of the drawn pattern band that falls within the detection area 170' is relatively small.

As illustrated in FIGS. 11(a) and 11(b), an effect of deviation in the main-scanning direction of a position where the sub-scanning-direction correction pattern 413 is drawn acts only on peak intensity of the detection signal. Such a decrease in peak intensity does not much matter so long as it is possible to determine a detection timing; this is because the sub-scanning-direction correction pattern 413 is detected only for the purpose of determining the detection timing.

Figure 12:
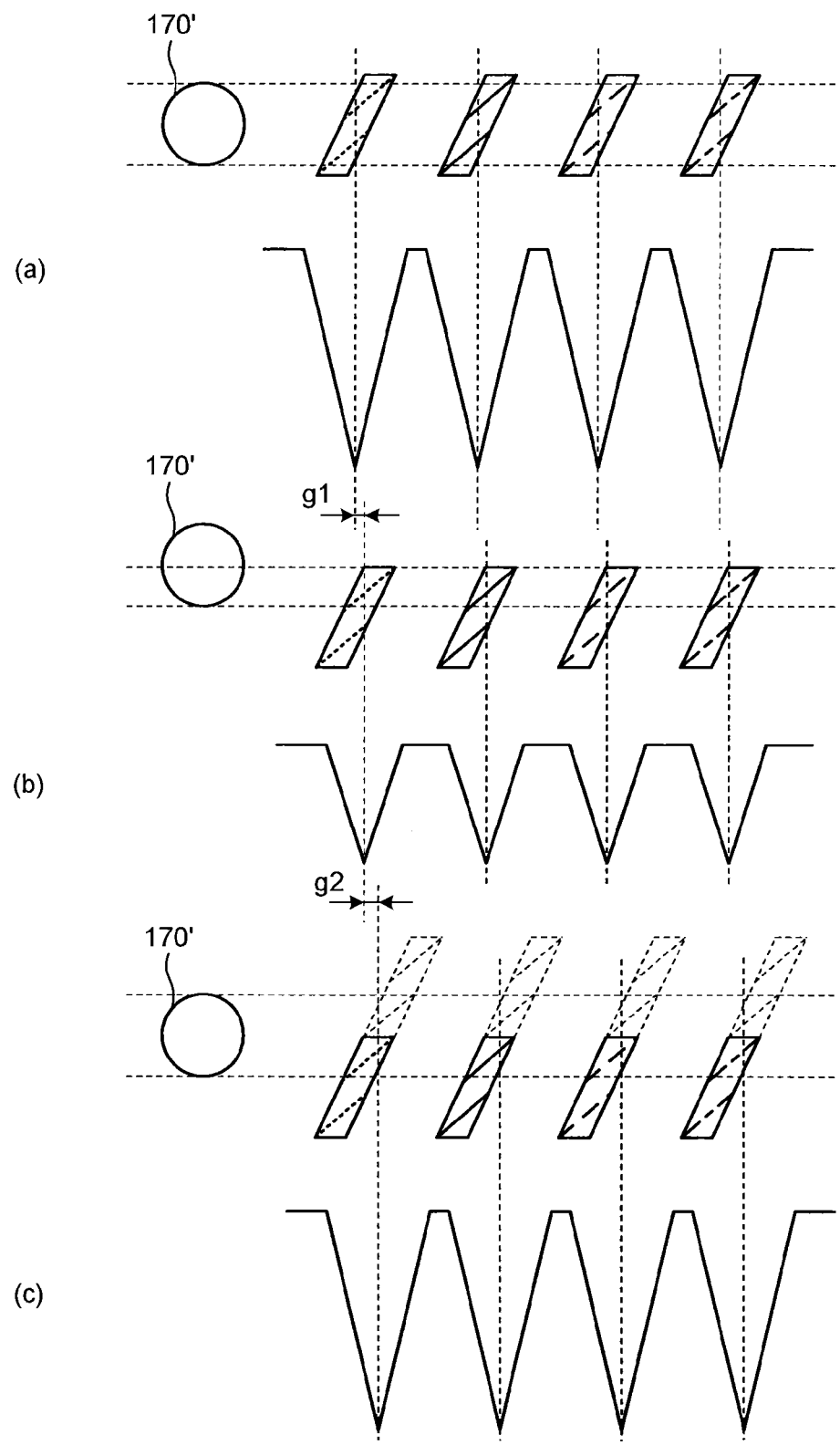
FIG. 12 is a diagram illustrating relationship between position of the positional-deviation correction pattern in the main-scanning direction and detection signal.

FIG. 12(a) to FIG. 12(c) are diagrams each illustrating relationship between position of the main-scanning-direction correction pattern 414 with respect to the detection area 170' of the sensing element 170, and detection signal. As in FIGS. 11(a) and 11(b), the vertical direction corresponds to the main-scanning direction and the horizontal direction corresponds to the sub-scanning direction in FIG. 12(a) to FIG. 12(c).

FIG. 12(a) is a diagram illustrating the relationship in a situation where the main-scanning-direction correction pattern 414 is drawn at a normal position with respect to the detection area 170' of the sensing element 170. As illustrated in FIG. 12(a), when the main-scanning-direction correction pattern 414 is drawn at the normal position with respect to the detection area 170', in each of pattern bands, a detection signal peaks at a timing when a center in the conveying direction of a portion of the pattern band that falls within the detection area 170' reaches the center of the detection area 170'.

FIG. 12(b) is a diagram illustrating the relationship in a situation where the main-scanning-direction correction pattern 414 is drawn at a position deviating in the main-scanning direction with respect to the detection area 170' of the sensing element 170. As illustrated in FIG. 12(b), when the main-scanning-direction correction pattern 414 is drawn at the position deviating in the main-scanning direction with respect to the detection area 170', a detection signal has a weaker peak. This is because a portion of the drawn pattern band that falls within the detection area 170' is relatively small.

Moreover, in the situation illustrated in FIG. 12(b), the further the main-scanning-direction correction pattern 414 deviates in the main-scanning direction, the further the signal detection timing deviates according to inclination of the main-scanning-direction correction pattern 414. The detection signal peaks at a timing when a center in the sub-scanning direction of a portion of the main-scanning-direction correction pattern 414 that falls within the detection area 170' reaches the center in the sub-scanning direction of the detection area 170'.

As a result, the timing deviates from the timing illustrated in FIG. 12(a) by "g1" indicated in FIG. 12(b). A main purpose of the correction using the main-scanning-direction correction pattern 414 is to adjust a position where the pattern is to be drawn according to this timing deviation. In FIGS. 12(a) to 12(c), all of the pattern bands in the main-scanning-direction correction pattern 414 are illustrated as being at the same position in the main-scanning direction. However, in actuality, the pattern bands can deviate from one another between the colors because the photosensitive drums 109 and the LEDAs 130 are mounted differently between the colors.

FIG. 12(c) is a diagram illustrating the relationship in a situation where the main-scanning-direction correction pattern 414 is drawn to have a margin in the main-scanning direction with respect to the detection area 170' of the sensing element 170 as described above with reference to FIG. 6 and the main-scanning-direction correction pattern 414 deviates in the main-scanning direction as in FIG. 12(b). In FIG. 12(c), portions of the main-scanning-direction correction pattern 414 that are not present in FIG. 12(b) are indicated by dotted lines.

Also in FIG. 12(c), a signal peaks at a timing when a center in the sub-scanning direction of a portion of the main-scanning-direction correction pattern 414 that falls within the detection area 170' reaches the center in the sub-scanning direction of the detection area 170'.

However, in FIG. 12(c), each of the pattern bands is drawn to have a width in the main-scanning direction that has the margin with respect to the detection area 170'. Accordingly, position of the center in the sub-scanning direction of the portion of the main-scanning-direction correction pattern 414 that falls within the detection area 170' differs from that of FIG. 12(b). Consequently, the timing when the peak appears deviates by "g2" indicated in FIG. 12(c). More specifically, although deviation in the main-scanning direction should be fundamentally corrected based on a total of "g1" and "g2", in the situation illustrated in FIG. 12(b), correction is undesirably made based on "g1".

However, correction based on "g1" is just made in the situation illustrated in FIG. 12(b). In the positional-deviation correction mark 400 illustrated in FIG. 10 according to the embodiment, the drum-spacing correction pattern 412 is repeatedly drawn, and the number of repetition cycles reaches that corresponding to a full perimeter of the conveying belt 105 illustrated in FIG. 3, for example. Accordingly, it is possible to reflect a result of correction made based on a pattern drawn at or near initial repetition cycle in drawing of the drum-spacing correction patterns 412 covering the full perimeter of the conveying belt 105. Therefore, even in the situation illustrated in FIG. 12(b), it becomes possible to bring a correction result nearer to an ideal value by repeatedly making correction based on a deviation amount corresponding to "g1".

Figure 13:
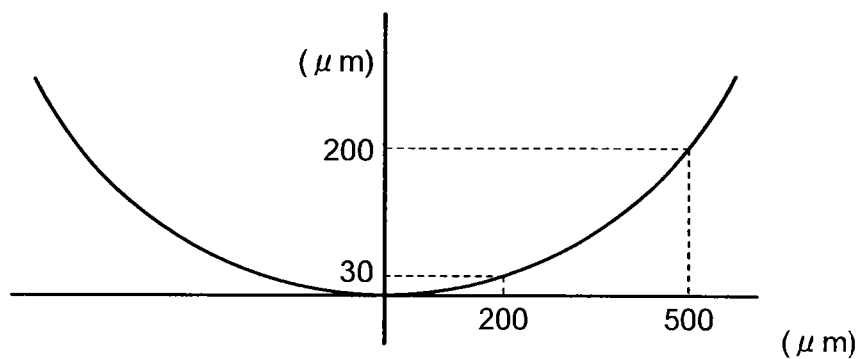
FIG. 13 is a diagram illustrating convergence of an error in the main-scanning direction after correction of an error in the main-scanning direction using the positional-deviation correction pattern.

FIG. 13 is a graph, in which the horizontal axis represents positional deviation in the main-scanning direction and the vertical axis represents accuracy of result of correction applied to the positional deviation by using the positional-deviation correction mark 400 according to the embodiment illustrated in FIG. 10, in which the width in the main-scanning direction of the drum-spacing correction patterns 412 depends on the detection area of the sensing element 170 and has a small margin.

Referring to FIG. 13, 500 µm is a largest predictive value of deviation in the main-scanning direction that is possible from a design standpoint. As illustrated in FIG. 13, in a situation where the deviation is approximately 500 µm, converging this deviation to correction accuracy of approximately 200 µm is possible. In a situation where the deviation is approximately 200 µm, converging this deviation to correction accuracy of approximately 40 µm is possible.

According to such characteristics as illustrated in FIG. 13, even in the situation illustrated in FIG. 12(b), an amount of deviation can be converged to approximately 40µ or smaller by performing correction after a result of already-applied correction is reflected at least one time during a period when the drum-spacing correction pattern 412 is repeatedly drawn to cover the full perimeter of the conveying belt 105.

As described above, none of disadvantages that can arise when the drum-spacing correction pattern 412 is drawn to have a width, in the main-scanning direction, with a small margin with respect to the detection area 170' of the sensing element 170 is critical. Accordingly, even when the drum-spacing correction pattern 412 is drawn to have a small margin with respect to the width in the main-scanning direction of the detection area 170', accuracy in device operation is not impaired greatly.

Figure 14:
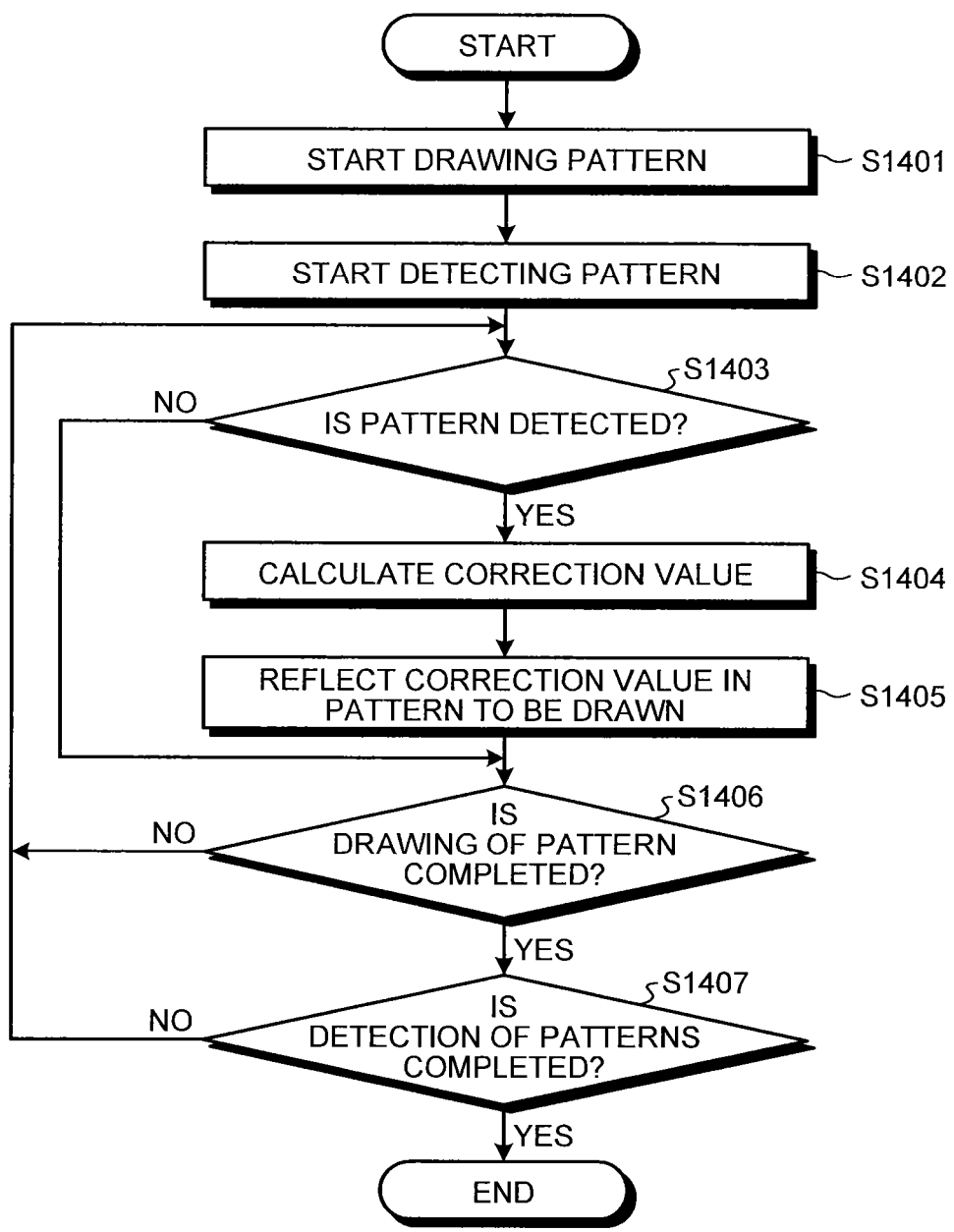
FIG. 14 is a flowchart of a procedure for a positional-deviation correcting operation according to the embodiment.

FIG. 14 is a flowchart of operations, which are a part of the positional-deviation correcting operation according to the embodiment, of repeatedly drawing the drum-spacing correction pattern 412 a predetermined number of repetition cycles or, in other words, in the embodiment, so as to cover the full perimeter of the conveying belt 105. As illustrated in FIG. 14, to perform the positional-deviation correcting operation, the optical-writing-device control unit 120 starts drawing the pattern (S1401), and starts detecting the pattern based on a detection signal output from the pattern detection sensor 117 (S1402).

When the optical-writing-device control unit 120 detects the pattern based on the detection signal output from the pattern detection sensor 117 (YES in S1403), the optical-writing-device control unit 120 calculates a correction value based on a result of the detection and stores the correction value in the correction-value storing unit 126 (S1404). Simultaneously, the optical-writing-device control unit 120 reflects the calculated correction value in drawing of the patterns of the positional-deviation correction mark 400 (S1405).

The optical-writing-device control unit 120 repeats operations from S1403 to S1405 until drawing of the pattern of the positional-deviation correction mark 400 is completed (NO in S1406). Furthermore, even after drawing of the pattern is completed (YES in S1406), operations from S1403 to S1405 are repeatedly performed until detection of the entire already-drawn pattern is completed (NO in S1407). When detection of the entire drawn pattern is completed (YES in S1407), the procedure ends.

In the operations described above, a pattern that is drawn after a correction value is reflected in S1405 is detected in S1403 of a later repetition cycle. A correction value is calculated based on a result of detection of this pattern in S1404. As a result, as described above, an amount of deviation in the main-scanning direction can be converged even in the situation illustrated in FIG. 12(b).

As described above, the optical writing device 120 according to the embodiment draws the positional-deviation correction mark 400 and the density correction mark 500 to generate parameters for use in correcting a drawing position and densities of an image in the following manner. Among the patterns contained in the positional-deviation correction mark 400, only the overall-position correction pattern 411 for use in not only correcting the position where the entire image is to be drawn but also in correcting detection timings of the other patterns is drawn with a margin in the main-scanning direction with respect to the detection area of the sensing element 170. The other patterns are drawn depending on the detection area of the sensing element 170 so as to have a small margin.

This configuration allows reducing an area where the patterns are drawn, thereby reducing toner consumption without sacrificing accuracy in device operation.

As described with reference to FIG. 14, in the embodiment, an example is described in which in the repetition cycles of repeatedly drawing the drum-spacing correction pattern 412 to cover the full perimeter of the conveying belt 105, an already-calculated correction value is applied in real time to drawing of the further pattern in a later repetition cycle. This scheme can converge an amount of deviation in the main-scanning direction as described above with reference to FIG. 13. However, alternatively, there may be employed a scheme of repeatedly drawing the pattern using the same parameter without applying a calculated correction value in real time.

Even when this scheme is employed, a generally required accuracy of approximately 250 μm can be satisfied. This is because this scheme can attain accuracy of 200 μm when the correction is performed in a condition where deviation in the main-scanning direction is 500 μm, which is possible maximum deviation from the design standpoint. Moreover, even in a situation where a position of the drum-spacing correction pattern 412 deviates in the main-scanning direction with respect to the detection area of the sensing element 170 and therefore a peak intensity of a signal is weak, possibility of successful peak detection can be increased by repeatedly detecting the drum-spacing correction pattern 412 that is repeatedly drawn.

The embodiment has been described using the optical writing device 111 that uses the LEDAs 130 as an example. However, a gist of the embodiment is to configure the positional-deviation correction mark 400 to have such a structure as illustrated in FIG. 10. Accordingly, application of the embodiment is not limited to the LEDAs 130; the embodiment is similarly applicable to any write head, such as an organic electro luminescence (EL) head, a laser diode (LD) array head, or a surface emitting laser.

However, a solid-state scanning system using the LEDA described above, the organic EL head, the LD array head, or the like increases positional accuracy in the main-scanning direction than a system that performs laser scanning in the main-scanning direction using a polygon mirror or the like. Accordingly, combined use of the solid-state scanning system and the positional-deviation correction mark 400 illustrated in FIG. 10 is more effective.

According to an aspect of the embodiment, reduction in amount of toner consumed to draw correction patterns and a degree of accuracy in device operation can be balanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical-writing control device that controls light sources to form electrostatic latent images on photosensitive elements, the light sources and the photosensitive elements being provided on a per-color basis of different colors, the optical-writing control device comprising:
   a light-emission control unit that controls each of the light sources based on information on pixels constituting an image to be formed, thereby exposing each of the photosensitive elements to light;
   a detection-signal acquiring unit that acquires a detection signal output from a sensor on a conveying path where developing-agent images obtained by developing the electrostatic latent images formed on the photosensitive elements using developing agents of the different colors are transferred and conveyed; and
   a correction-value calculating unit that calculates correction values for use in correcting a transfer position at which the developing-agent images are to be transferred onto a sheet, overlaying positions at which the developing-agent images of the different colors are to be overlaid on one another, and densities of the developing-agent images based on the detection signal output from the sensor upon detection of a correction pattern for use in correcting the transfer position, a correction pattern for use in correcting the overlaying positions, and a correction pattern for use in correcting the densities, wherein
   the detection-signal acquiring unit determines a timing of detecting the correction pattern for use in correcting the overlaying positions and a timing of detecting the correction pattern for use in correcting the densities based on a correction value calculated based on the detection signal output upon detection of the correction pattern for use in correcting the transfer position,
   the light-emission control unit controls light emission from each of the light sources so as to cause the correction pattern for use in correcting the overlaying positions to have a width, in a main-scanning direction, that depends on a width in the main-scanning direction of a detection area of the sensor, and controls light emission from each of the light sources so as to cause the correction pattern for use in correcting the transfer position to have a width, in the main-scanning direction, that is wider than the width in the main-scanning direction of the correction pattern for use in correcting the overlaying positions, and
   the correction pattern for use in correcting the transfer position is a pattern for correcting a positional deviation of an entire image in a sub-scanning direction.

2. The optical-writing control device according to claim 1, wherein the light-emission control unit controls light emission from each of the light sources so that the correction pattern for use in correcting the overlaying positions is repeatedly drawn a plurality of times.

3. The optical-writing control device according to claim 2, wherein during a period when the light-emission control unit controls light emission from each of the light sources so that the correction pattern for use in correcting the overlaying positions is repeatedly drawn the plurality of times, the light-emission control unit corrects a parameter for use in controlling light emission from each of the light sources based on a correction value generated by detecting the already-drawn correction pattern.

4. An image forming apparatus comprising an optical-writing control device that controls light sources to form electrostatic latent images on photosensitive elements, the light sources and the photosensitive elements being provided on a per-color basis of different colors, the optical-writing control device comprising:

a light-emission control unit that controls each of the light sources based on information on pixels constituting an image to be formed, thereby exposing each of the photosensitive elements to light;

a detection-signal acquiring unit that acquires a detection signal output from a sensor on a conveying path where developing-agent images obtained by developing the electrostatic latent images formed on the photosensitive elements using developing agents of the different colors are transferred and conveyed; and a correction-value calculating unit that calculates correction values for use in correcting a transfer position at which the developing-agent images are to be transferred onto a sheet, overlaying positions at which the developing-agent images of the different colors are to be overlaid on one another, and densities of the developing-agent images based on the detection signal output from the sensor upon detection of a correction pattern for use in correcting the transfer position, a correction pattern for use in correcting the overlaying positions, and a correction pattern for use in correcting the densities, wherein the detection-signal acquiring unit determines a timing of detecting the correction pattern for use in correcting the overlaying positions and a timing of detecting the correction pattern for use in correcting the densities based on a correction value calculated based on the detection signal output upon detection of the correction pattern for use in correcting the transfer position, the light-emission control unit controls light emission from each of the light sources so as to cause the correction pattern for use in correcting the overlaying positions to have a width, in a main-scanning direction, that depends on a width in the main-scanning direction of a detection area of the sensor, and controls light emission from each of the light sources so as to cause the correction pattern for use in correcting the transfer position to have a width, in the main-scanning direction, that is wider than the width in the main-scanning direction of the correction pattern for use in correcting the overlaying positions, and the correction pattern for use in correcting the transfer position is a pattern for correcting a positional deviation of an entire image in a sub-scanning direction.

5. A method of controlling an optical-writing control device that controls light sources to form electrostatic latent images on photosensitive elements, the light sources and the photosensitive elements being provided on a per-color basis of different colors, the optical-writing control device including a light-emission control unit that controls each of the light sources based on information on pixels constituting an image to be formed, thereby exposing each of the photosensitive elements to light, a detection-signal acquiring unit that acquires a detection signal output from a sensor on a conveying path where developing-agent images obtained by developing the electrostatic latent images formed on the photosensitive elements using developing agents of the different colors are transferred and conveyed, and a correction-value calculating unit that calculates correction values for use in correcting a transfer position at which the developing-agent images are to be transferred onto the sheet, overlaying positions at which the developing-agent images of the different colors are to be overlaid on one another, and densities of the developing-agent images based on detection signals output from the sensor upon detection of a correction pattern for use in correcting the transfer position, a correction pattern for use in correcting the overlaying positions, and a correction pattern for use in correcting the densities, the method comprising:

controlling light emission from each of the light sources so as to cause the correction pattern for use in correcting the overlaying positions to have a width, in a main-scanning direction, that depends on a width in the main-scanning direction of a detection area of the sensor;

controlling light emission from each of the light sources so as to cause the correction pattern for use in correcting the transfer position to have a width, in the main-scanning direction, that is wider than the width in the main-scanning direction of the correction pattern for use in correcting the overlaying positions; and determining a timing of detecting the correction pattern for use in correcting the overlaying positions and a timing of detecting the correction pattern for use in correcting the densities based on a correction value calculated based on the detection signal output upon detection of the correction pattern for use in correcting the transfer position, wherein the correction pattern for use in correcting the transfer position is a pattern for correcting a positional deviation of an entire image in a sub-scanning direction.

6. The method according to claim 5, further comprising:

controlling, by the light-emission control unit, light emission from each of the light sources so that the correction pattern for use in correcting the overlaying positions is repeatedly drawn a plurality of times.

7. The method according to claim 6, further comprising:

correcting, by the light-emission control unit, a parameter for use in controlling light emission from each of the light sources based on a correction value generated by detecting the already-drawn correction pattern, during a period when the light-emission control unit controls light emission from each of the light sources so that the correction pattern for use in correcting the overlaying positions is repeatedly drawn the plurality of times.

\* \* \* \* \*